Aug. 9, 1966   P. E. LORANG   3,265,410
PIPE OF SYNTHETIC PLASTIC MATERIAL AND COUPLING
INCLUDING SAID PIPE
Filed July 7, 1964   2 Sheets-Sheet 1
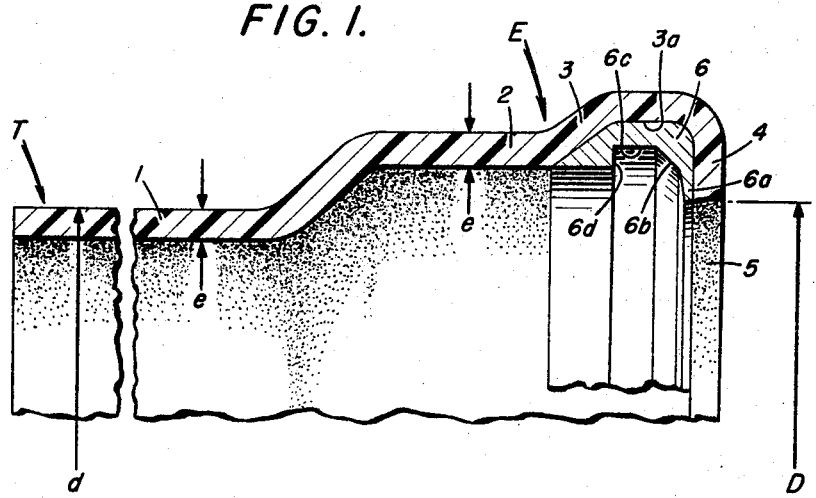
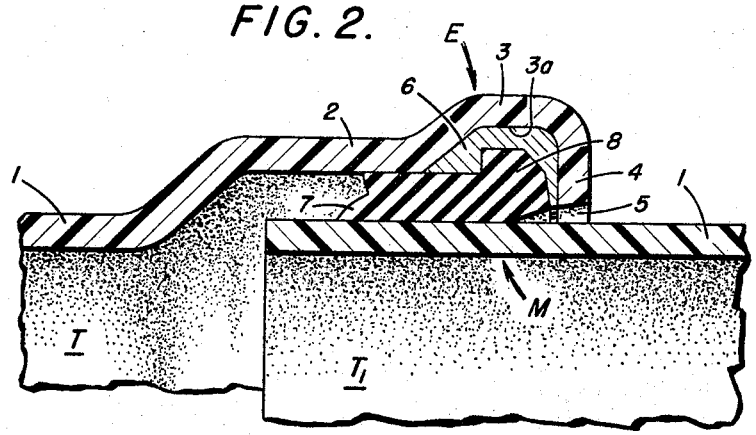
PIERRE EDOUARD LORANG
INVENTOR
BY  J. Delattre-Seguy
ATTORNEY

PIERRE EDOUARD LORANG
INVENTOR

BY J. Delattre-Seguy

ATTORNEY

United States Patent Office 3,265,410
Patented August 9, 1966

3,265,410
PIPE OF SYNTHETIC PLASTIC MATERIAL AND COUPLING INCLUDING SAID PIPE
Pierre Edouard Lorang, Nancy, France, assignor to Centre de Recherches de Pont-a-Mousson, Pont-a-Mousson, France, a French body corporate
Filed July 7, 1964, Ser. No. 380,792
Claims priority, application France July 24, 1963
3 Claims. (Cl. 285—110)

The present invention relates to pipes and other pipe elements composed of thermoplastic of the type having a socket and male end and in particular to a new construction of their sockets.

The socket can be formed by expanding the cylindrical end of an extruded pipe. It is then made thinner and when it must withstand a certain internal pressure, it must be reinforced, for example by a sheath fitting round the outer surface. This outer sheath is attached to the pipe, which requires a further operational stage.

A socket can also be molded with sufficient thickness to withstand an internal pressure in the form of a cylindrical sleeve whose ends are inwardly formed over. Such a socket or sleeve is secured by adherence to the end of the pipe. Apart from the additional adhering operation, which requires much attention, this method has the disadvantage of necessitating two joints for the assembly of two pipes. One of these joints is formed by a sealing washer or element interposed between the sleeve of one of the pipes and the male end of the adjoining pipe. The other of these joints is formed by the zone in which the sleeve is adhered to the corresponding pipe. There are therefore two joints to attend to or control when assembling two pipe elements.

The object of the present invention is to avoid these drawbacks. The invention provides a pipe having a male end and a socket of a thermoplastic material, wherein the socket, which is integral with the body of the pipe, has a thickness at least equal to that of the body of the pipe and comprises, internally at the entrance end, an annular chamber for housing an inner rigid reinforcing ring which itself serves as a housing for at least a part of a sealing member.

Owing to the increased thickness of the socket with respect to known constructions, the reinforcing sheath for the socket is unnecessary. If the thickness of the socket is greater than that of the body of the pipe, the socket can have a resistance to bursting pressure at least equal to that of the body of the pipe.

Further, owing to the inner reinforcing ring, the socket conserves its inner dimensions which are precise and stable regardless of the climatic conditions of utilization, and it is undeformable under the effect of exterior mechanical forces, in particular when handling or assembling.

Another object of the invention is to provide a joint between two pipe elements of the type defined hereinbefore, with interposition of a sealing element.

Further features and advantages of the invention will be apparent from the ensuing description, with reference to the accompanying drawing to which the invention is in no way limited.

FIG. 1 is a longitudinal partial sectional view of a pipe according to the invention;

FIG. 2 is a partial longitudinal sectional view of a joint between the male end of one pipe and the socket of another pipe;

Figure 3:
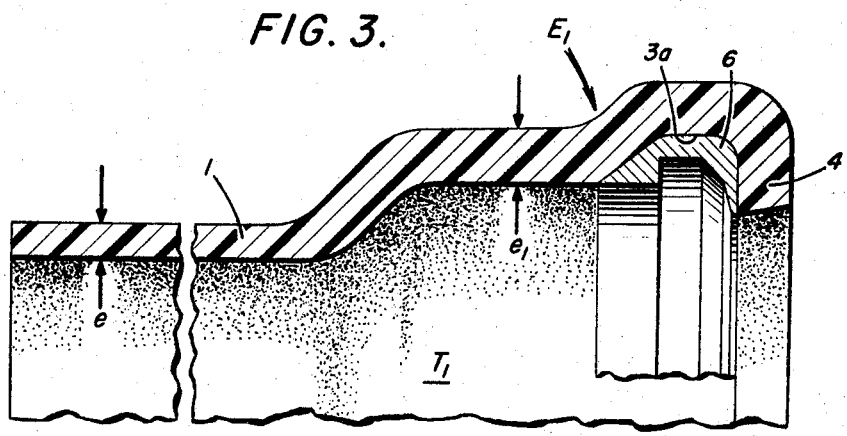
FIG. 3 is a view similar to FIG. 1 of a modification of a pipe according to the invention.

In the embodiment shown in FIG. 1, the invention is applied to a pipe T composed of thermoplastic material, for example rigid polyvinyl chloride, and of the type provided with a socket E and a cylindrical body terminating in a cylindrical and smooth male end 1 which constitutes the male end M for the pipe joint (FIG. 2).

According to the invention, the socket E of the pipe has, starting at the body 1 of the pipe, a flared portion 2 followed by an enlarged portion 3 constituting an annular chamber 3a which is defined at the entrance of the socket by an inwardly extending flange 4. The latter defines a circular socket entrance 5 having a diameter D slightly greater than the outside diameter d of the body of the pipe. According to the invention, the socket wall has a thickness e which is equal to that of the wall of the body of the pipe. This is achieved by means of a suitable forming operation which avoids thinning down the pipe wall when expanding the pipe end.

This forming operation can be, for example, that described in the French Patent Application No. 942,480, filed by the applicant on July 24, 1963, now Patent No. 1,377,324, issued September 28, 1964, and which comprises expanding the end of a pipe by means of a punch within a mould, and then upsetting the expanded end so as to cause it to fill the annular space between the punch and the mould.

According to one of the features of the invention, there is disposed in the annular chamber 3a a rigid inner ring 6 which has good dimensional stability and strength. This ring has for example a hollow cross-section approximately in the shape of a J. The J-shaped ring has an inner transverse face 6a on a flange or lip portion of the ring which corresponds to the base of the J and to the radial width of the flange 4, a frustoconical inner face 6b, a cylindrical inner face 6c, and a shoulder 6d. The faces 6a, 6b, 6c and 6d define an inner recess. The ring 6 can be of metal or synthetic plastic. It is mounted without clearance in the annular chamber 3 and is held in position in its housing by the flange 4. For this purpose, the flange 4 is formed over, after the ring 6 has been placed in position, by heating the end of the socket to an axial extent corresponding to the radial width of the flange to be obtained and by a flange-forming operation by means of a punch in the known manner. It should be noted that, owing to its stiffness, the part 6a of the ring 6 acts as a reinforcement for the flange 4.

In the embodiment shown in FIG. 2, a sealing element 7 of rubber of the type having thick lips and an annular chamfered end anchoring rib 8, similar to that described in the French Patent No. 1,168,647, filed on February 21, 1957, is mounted in the socket. The anchoring rib 8 is disposed in the annular recess formed by the inner face of the ring 6. The body and the lips 7 of the sealing element are compressed and crushed radially between the inner face of the flared portion of the socket and the outer face of the male end M of a pipe $T_1$ inserted into the socket E of the pipe T. The pressure of contact between this sealing element and the male end M of the pipe $T_1$ and the socket E of the pipe T affords a perfect seal as concerns both low and high pressure. Further, the part 6a of the reinforcing ring resist any force tending to uncouple the pipes, namely tending to expel axially the sealing element.

Apart from the aforementioned mechanical advantages, the socket according to the invention has considerable aesthetic advantages, since it is integral with the body of the pipe and merely forms a flared extension thereof.

According to a modification of the invention shown in FIG. 3, the pipe $T_1$ has a socket $E_1$ whose thickness $e_1$ exceeds the thickness e of the wall of the body of the pipe so that the strength thereof is increased. This greater thickness can be obtained by the aforementioned method.

Figure 4:
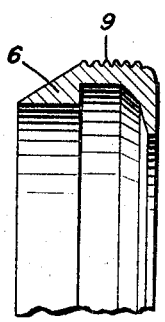
FIG. 4 is a detail sectional view of a portion of a variant of the reinforcing ring.

In the variant shown in FIG. 4, the reinforcing ring 6 has, on at least a part of its outer face, ribs 9 which provide an improved anchorage of the ring in the wall of the annular chamber 3.

Although specific embodiments of the invention have been described, many modifications and changes may be made therein without departing from the scope of the invention as defined in the appended claims.

Thus, the rigid reinforcing ring can have any other cross-sectional shape which is suitable for the housing of a sealing element having a shape different from the element 7 described hereinbefore by way of example.

Having now described my invention what I claim as new and desire to secure by Letters Patent is:

1. A pipe element of thermoplastic material having a body, a male end and a socket, the socket being part of the same material as the body and having a single wall the thickness of which is at least equal to that of the wall of the body;

the socket including an intermediate flared portion integral with the body, an enlarged portion integral with said flared portion and adjacent the entrance of the socket, a radial, inwardly extending flange provided at the entrance of the socket, and an internal annular chamber located in said enlarged portion;

a rigid reinforcing ring fixed in said annular chamber in close reinforcing contact with the walls of the socket forming said annular chamber, the reinforcing ring being trough-shaped in cross-section, comprising a cylindrical portion forming the base of said trough, a substantially frustoconical portion adjacent the forward end of said cylindrical portion and converging outwardly toward the flange of the socket, and an inwardly extending annular lip portion in axial abutting relation to the flange of the socket, the lip portion of the ring and the flange of the socket extending inwardly to the same radial extent, whereby said flange and the enlarged portion of the socket completely encase and are wholly reinforced by the ring;

a sealing element having a substantially uniform resiliency, fitted within said ring, said sealing element being kept wholly apart from the flange of the socket by the lip portion of the reinforcing ring and extending radially inward a distance greater than that of the flange of the socket and of the lip portion of the ring, and extending axially toward said body a distance greater than the axial dimension of said enlarged portion of the socket, whereby the portion of said sealing element away from said flange and lip portion is in contact with the wall of said flared portion of the socket.

2. A pipe element as claimed in claim 1, in which the thickness of the wall of said socket is greater than that of the wall of said body.

3. A pipe element as claimed in claim 1, in which the reinforcing ring is provided on at least the outer wall of said cylindrical portion with ribs fitting into the walls of the socket forming said annular chamber.

References Cited by the Examiner

UNITED STATES PATENTS

| 1,357,311 | 11/1920 | Buente. | |
| 2,017,154 | 10/1935 | Larkin | 285—382 X |
| 3,078,332 | 2/1963 | Marx | 285—369 X |

FOREIGN PATENTS

| 1,164,871 | 5/1958 | France. |
| 1,224,963 | 2/1960 | France. |
| 1,275,980 | 10/1961 | France. |
| 1,320,863 | 2/1963 | France. |

OTHER REFERENCES

Stewart-Warner, Belgium printed abstract No. 608,270, filed Sept. 7, 1961.

CARL W. TOMLIN, *Primary Examiner.*

R. GIANGIORGI, *Assistant Examiner.*